United States Patent
Ono

(10) Patent No.: US 6,751,234 B1
(45) Date of Patent: Jun. 15, 2004

(54) PACKET DATA TRANSFER APPARATUS

(75) Inventor: Yoshihiro Ono, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/562,201

(22) Filed: May 2, 2000

(30) Foreign Application Priority Data

May 12, 1999 (JP) .......................................... 11-131001

(51) Int. Cl.[7] ................................................ H04J 3/24
(52) U.S. Cl. ........................ 370/474; 370/401; 370/229
(58) Field of Search ................................ 370/400, 401, 370/465, 467, 473, 474, 229, 230, 231; 714/712

(56) References Cited

U.S. PATENT DOCUMENTS 6,477,670 B1 * 11/2002 Ahmadvand ................ 714/712

FOREIGN PATENT DOCUMENTS

| EP | 0 905 950 A1 | 3/1999 |
|---|---|---|
| JP | 5-153131 | 6/1993 |
| JP | 6-164581 | 6/1994 |
| JP | 9-83775 | 3/1997 |
| JP | 10-136053 | 5/1998 |
| WO | WO 98/45994 | 10/1998 |

OTHER PUBLICATIONS

Uyless Black, OSI A Model for Computer Communications Standards, Prentice Hall, pp. 8–26.*
Uyless Black, "OSD A Model for Computer Communications Standards" dated 1991, Prentice–Hall Inc. pp. 8–12 & 23–26.*
Copy of Japanese Office Action dated Jul. 8, 2003 (and English translation of relevant portion).

* cited by examiner

Primary Examiner—Douglas Olms
Assistant Examiner—Robert W. Wilson
(74) Attorney, Agent, or Firm—Dickstein, Shapiro, Morin & Oshinsky, LLP

(57) ABSTRACT

For information acquisition and control of a radio packet transmission and reception controlling section 201, a radio packet control interface 204 is prepared, and based on radio channel information obtained through this interface, an IP packet transmission and reception controlling section 301 dynamically controls a maximum packet size, and a TCP segment transmission and reception controlling section 401 dynamically controls a maximum segment size, and issues a radio channel control demand to a radio packet transmission and reception controlling section 201 in accordance with transfer demand condition of a user data in a high position, which is obtained through a TCP control interface 404.

6 Claims, 9 Drawing Sheets

PACKET DATA TRANSFER APPARATUS

BACKGROUND OF THE INVENTION

The present invention relates to a packet data transfer apparatus for radio packet communication, and especially to a TCP segment size controlling method, and radio packet system control which depends on user data occurrence condition.

In FIG. 5, a protocol stack between two communication terminals that conduct a TCP data transfer on radio packet communication is shown. Here, it is assumed that each layer is taking a share in a function in accordance with an OSI reference model.

A radio link is provided between a packet data transfer apparatus 10 and a radio base station 20, and provides radio packet communication by a layer 2 and less than or equal to that. A wire link is provided between the radio base station 20 and a gateway device 30, and the layer 2 and less than or equal to that have unique protocols within a net.

A wire link is provided between the gateway device 30 and a packet data transfer apparatus 40, and the layer 2 and less than or equal to that have other protocols within a net. A case can be considered, in which an ethernet is used here.

It is assumed that, in a layer 3, an IP is used between the packet data transfer apparatus 10 and the packet data transfer apparatus 40. It is assumed that, in a layer 4, a TCP is used between the packet data transfer apparatus 10 and the packet data transfer apparatus 40.

A user data to be transferred, which occurs in a user application on the packet data transfer apparatus 10 is shaped into a TCP segment in the TCP (layer 4), is shaped into an IP packet in the IP (layer 3), to which an IP header is added, and is converted into a frame in the layer 2, which is unique to radio packet communication, and thereafter, is sent by means of radio in a layer 1.

The radio frame which was sent by means of radio from the packet data transfer apparatus 10 is received by the radio base station 20, and is transferred to the gateway device 30 by using a unique transfer method in a net protocol.

In the gateway device 30, the IP packet is reconstructed, and the IP packet is transferred through a net such as an ethernet, and is transferred to the packet data transfer apparatus 40.

In the packet data transfer apparatus 40, a user data is taken out from the reconstructed TCP segment, and is delivered to a user application on the packet data transfer apparatus 40.

In FIG. 6, a block diagram of a packet data transfer apparatus for conducting a TCP data transfer at a radio packet by means of a prior art is shown.

A TCP segment generating section 402 receives a transmitted user data and generates a TCP segment having a size of which an upper limit is a maximum segment size, and delivers it to an IP packet generating section 302. The IP packet generating section 302 adds an IP header to the TCP segment which was received from the TCP segment generating section 402, and generates an IP packet, and delivers it to a radio packet generating/transmitting section 202.

The radio packet generating/transmitting section 202 reconstructs the IP packet into a unique frame in radio packet communication, and delivers it to a radio transmission and reception processing section 102.

The radio transmission and reception processing section 102 conducts radio transmission of the transmitted radio frame from the radio packet generating/transmitting section 202 through a transmission and reception antenna 101. Also, the radio transmission and reception processing section 102 takes out a received radio frame from the transmission and reception antenna 101, and delivers it to a radio packet receiving section 203.

The radio packet receiving section 203 reconstructs a radio packet from the radio frame, and delivers it to an IP packet receiving section 303.

The IP packet receiving section 303 reconstructs the radio packet which was received from the radio packet receiving section 203 into an IP packet, and delivers it to a TCP segment receiving section 403.

The TCP segment receiving section 403 reconstructs a TCP segment from the IP packet, and outputs a received user data.

A radio packet transmission and reception controlling section 201 controls the radio packet generating/transmitting section 202 and the radio packet receiving section 203 based on information from the radio transmission and reception processing section 102. Also, the radio packet transmission and reception controlling section 201 conducts control in accordance with a control data addressed to the radio packet transmission and reception controlling section 201, which was received from the radio base station 20, and at the same time, transmits the control data to a radio packet transmission and reception controlling section (not shown) of the radio base station 20.

The transmitted control data from the radio packet transmission and reception controlling section 201 is transmitted and processed from the radio packet transmission and reception controlling section 201 through the radio packet generating/transmitting section 202 like the user data.

In the same manner, a received control data from a radio packet transmission and reception controlling section (not shown) of the radio base station 20 is received and processed in the radio transmission and reception processing section 102 like the user data, and thereafter, is delivered to the radio packet transmission and reception controlling section 201 through the radio packet receiving section 203.

An IP packet transmission and reception controlling section 301 controls the IP packet generating section 302 and the IP packet receiving section 303. Also, the IP packet transmission and reception controlling section 301 notifies a TCP segment transmission and reception controlling section 401 of a maximum size (MTU; Maximum Transport Unit) of an IP packet during initial setting of a data transfer.

The TCP segment transmission and reception controlling section 401 controls the TCP segment generating section 402 and the TCP packet receiving section 403. Also, during a data transfer, the TCP segment transmission and reception-controlling section 401 conducts transmission and reception of a control data with a TCP segment transmission and reception controlling section (not shown) that is other party to communicate with, and controls a confirmation response, resending, transmission and reception rate and so forth of a TCP segment. Further, the TCP segment transmission and reception controlling section 401 exchanges a data with a control interface 404 for transferring a TCP data to a user application.

In FIG. 7, a flowchart of maximum segment size control of a TCP by means of a prior art is shown.

First, after initialization, a maximum segment size (MSS; Maximum Segment Size) of a TCP is set only one time when a TCP connection is established (A-1). This is calculated based on the MTU which was notified from the IP packet transmission and reception controlling section 301.

Next, in case that a transmitted user data exists (A-2), a segment is generated (A-3), and segment sending processing is conducted (A-4).

In FIG. 8, a data flow between layers until a user data is divided and processed into a size to be transferred by means of a radio frame is shown.

A user data is delivered to the radio packet generating/sending section 202 under condition that a TCP header is added thereto in a TCP layer and an IP header is added thereto in an IP layer. In the radio packet generating/sending section 202, a unique overhead (shown as "OH" in FIG. 8) in this layer is added thereto, and it is divided into radio frame unit.

Here, in a radio frame 1, a radio packet to be transferred is being divided into just n. Although, in a radio frame 2, the radio packet to be transferred is being divided into three, since a data in a high position, which fills up a third radio frame, does not exist, padding of a useless data (a zero value and so forth) is conducted.

In FIG. 9, a time line of a TCP data transfer on radio packet communication by means of a prior art is shown. Between the radio base station 20 and the gateway device 30, and between the gateway device 30 and the packet data transfer apparatus 40, condition in which a data transfer can be conducted by means of respective unique protocols within a net is established.

For the radio link between the packet data transfer apparatus 10 and the radio base station 20, a low-speed radio link is used when a data to be transferred is comparatively less, and a high-speed radio link is used when a data to be transferred is comparatively more. With regard to the switch of both high-speed and low-speed, the radio base station 20 monitors throughput of a data transfer, and when it is determined that the throughput is large, switching to the high-speed link is conducted, and when it is determined that the throughput is small, switching to the low-speed link is conducted. When there is no user data to be transferred, condition of the low-speed radio link is established.

Here, an example in which a demand for a transfer of a user data occurs in the packet data transfer apparatus 10 is shown.

A connection of a TCP is established under condition of a low-speed radio link. Since a TCP segment for establishment of the connection of the TCP is small, it is determined as it is that the throughput is small.

If, at time when a data transfer demand occurs and a time period Ta has passed, the radio base station 20 determines that the throughput is large, the radio link is set to a high-speed link again. A subsequent data transfer is conducted over a time period Tb in the high-speed radio link, and a cut of the TCP connection is conducted, and a transfer of the user data is finished. After the transfer of the user data is finished and a time period Tc has passed, the radio base station 20 determines that the throughput is small, and the radio link is set to a low-speed radio link again.

A first problem of the prior art is that the maximum segment size is consistently fixed during communication. The reason thereof is that the maximum segment size is set only at the initial setting of an operation.

A second problem is that control of the TCP, which is connected with an operation of layers in a subordinate position, cannot be conducted. Also, control of the layers in a subordinate position, which depends on condition of the occurrence of user data of the TCP, cannot be conducted. The reason thereof is that an interface for an information exchange between the layers in a subordinate position and the TCP does not exist.

SUMMARY OF THE INVENTION

The present invention is made to solve the above-mentioned problems.

Moreover, the objective of the present invention is to improve the throughput of a TCP data transfer in radio packet communication. Also, the objective is to realize more efficient utilization of radio resources.

In the present invention, in order to solve the above-described tasks, as first means, an interface for exchanging mutual operation information between the layers in a subordinate position and the TCP is prepared. As second means, when a change occurs in transfer condition of the layers in a subordinate position, in accordance with that, the maximum segment size is also reset to most suitable one in time. As third means, the maximum segment size in a radio section can be notified to a TCP that is other party to communicate with in the middle of a data transfer. As fourth means, the setting of transfer condition of the layers in a subordinate position can be changed dependent on condition of the occurrence of a user data of the TCP.

By means of the above-described first means, the operations shown in relation to the second and fourth means are realized. Thereby, cooperation of the operations of the TCP and the layers in a subordinate position can be realized.

By means of the second means, dynamic TCP segment size control in which uselessness does not occur for a frame size of the layers in a subordinate position is conducted. Accordingly, since a more efficient transfer of a user data can be realized, the throughput is improved.

By means of the third means, also with respect to a data transfer from the TCP that is other party to communicate with, a data transfer is conducted, in which the most sutable maximum segment size control is conducted in a radio section. Accordingly, since a more efficient transfer of a user data can be realized, the throughput is improved.

By means of the fourth means, transfer condition control of the layers in a subordinate position, which is appropriate for a frequency of the occurrence of a user data of a TCP, is conducted. Accordingly, since a more efficient transfer of the user data can be realized, the throughput is improved, and at the same time, an effective allocation of radio resources can be realized.

BRIEF DESCRIPTION OF THE INVENTION

This and other objects, features, and advantages of the present invention will become more apparent upon a reading of the following detailed description and drawings, in which.

DESCRIPTION OF THE EMBODIMENTS

Embodiments of the present invention will be explained in detail by referring to drawings.

Figure 1:
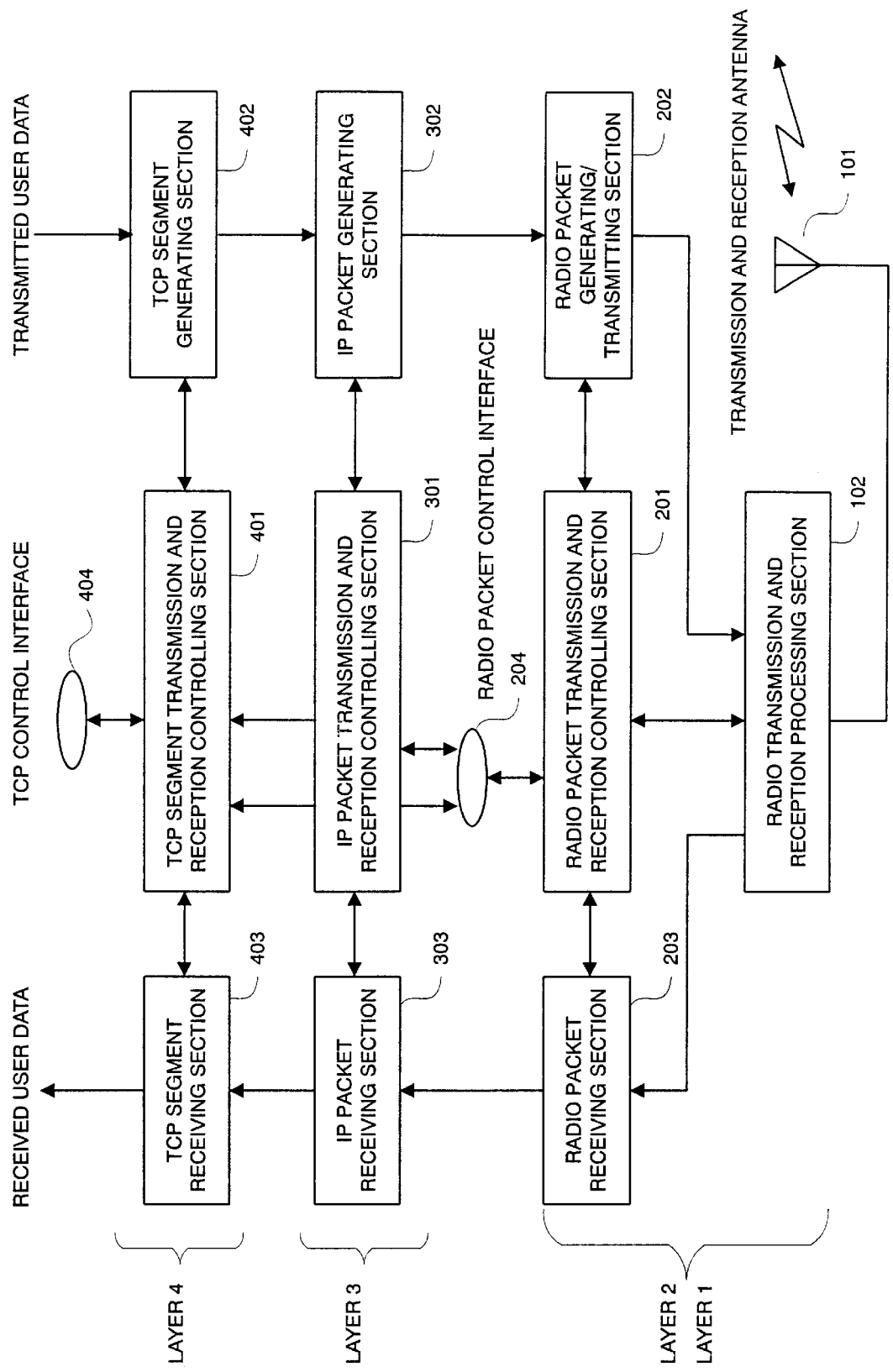
FIG. 1 is a constitution block diagram of a radio packet data transfer apparatus of,the present invention.

In FIG. 1, a block diagram of an embodiment of the present invention is shown.

Figure 6:
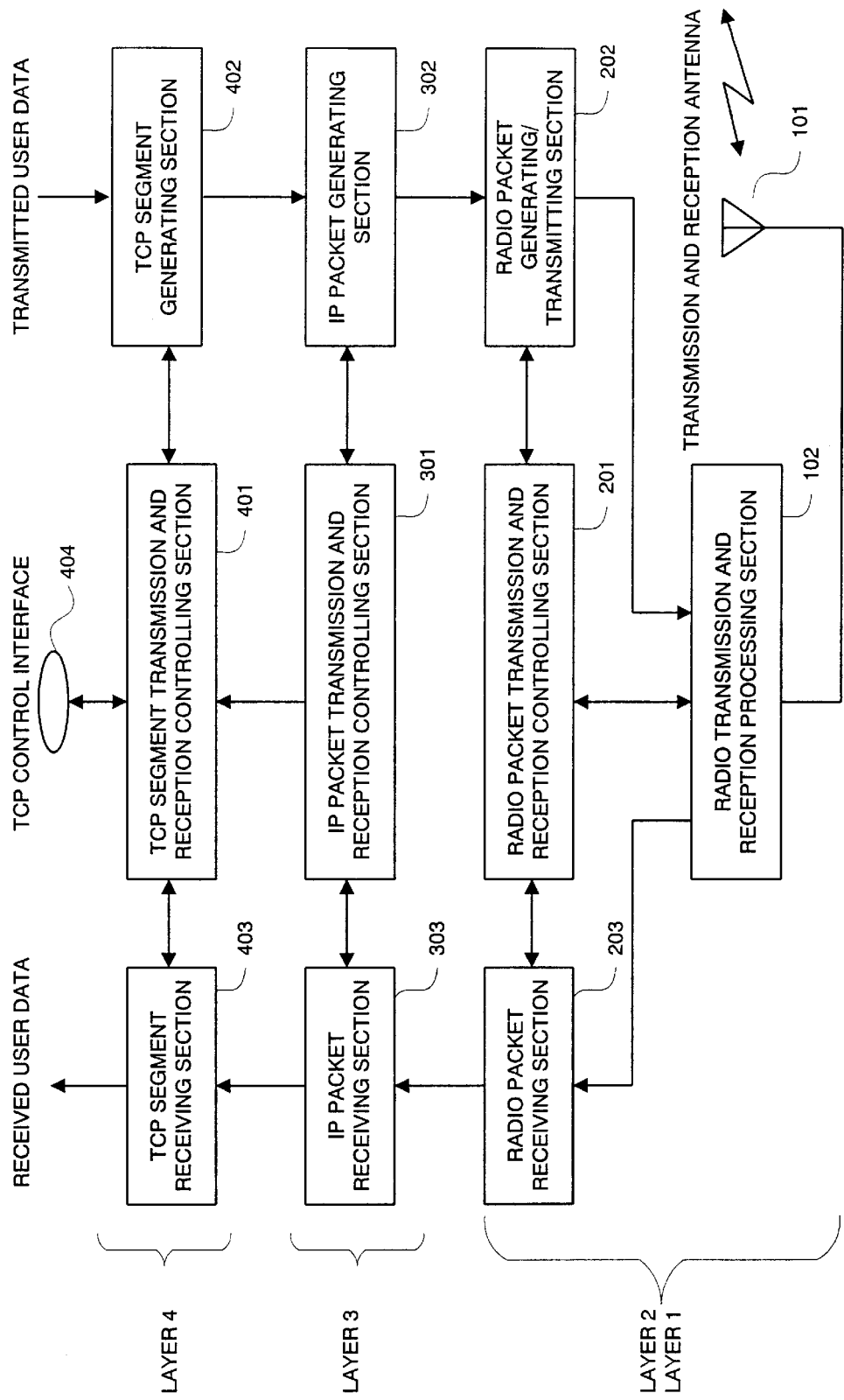
FIG. 6 is a constitution block diagram of a conventional radio packet data transfer apparatus.
Figure 7:
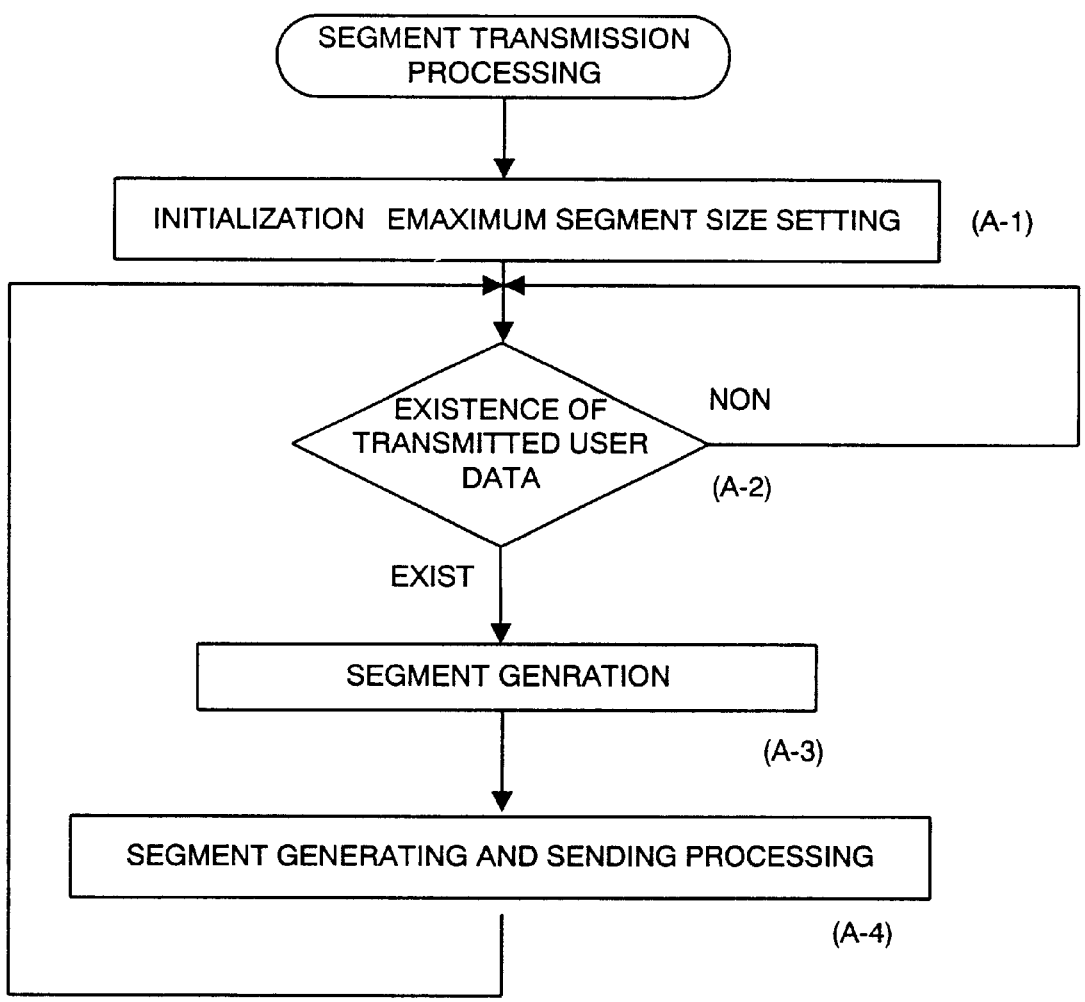
FIG. 7 is a view showing a flowchart of TCP maximum segment size control of the conventional radio packet data transfer apparatus.

With regard to elements same as those in the constitution block diagram of the prior art, which was shown in FIG. 6, the same symbols are attached, and explanation thereof is omitted.

A radio packet control interface 204 discloses information of radio packet transmission and reception processing control to other modules, which is conducted in a radio packet transmission and reception controlling section 201. Also, a service for indirectly controlling radio packet transmission and reception control is provided through this radio packet control interface 204.

An IP packet transmission and reception controlling section 301 acquires a current radio packet transmission size through the radio packet control interface 204, in addition to the functions shown in relation to the prior art, and controls a maximum size (MTU) of a transmitted IP packet.

A TCP segment transmission and reception controlling section 401 acquires a current radio packet transmission size through the radio packet control interface 204, in addition to the functions shown in relation to the prior art, and controls a maximum size (MSS) of a transmitted TCP segment. Further, the TCP segment transmission and reception controlling section 401 issues a control demand for transmission and reception control of a radio packet through the radio packet control interface 204 in accordance with the contents of a data transfer demand from a user application. Here, the contents of the data transfer demand from the user application can be acquired from a TCP control interface 404 and the contents of a transmitted user data.

Next, an operation of this embodiment will be explained.

Figure 2:
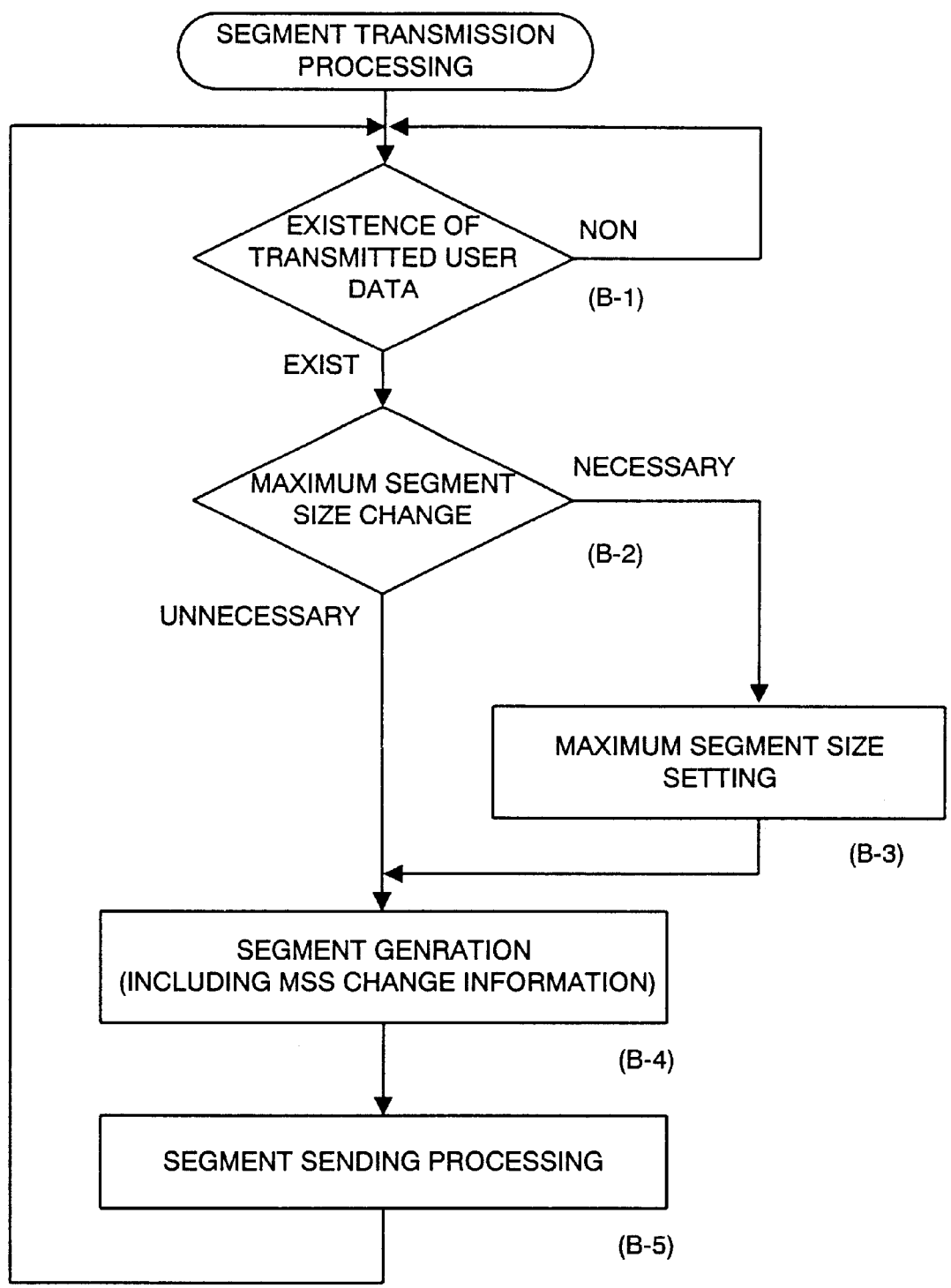
FIG. 2 is a view showing a flowchart of TCP maximum segment size control of the radio packet data transfer apparatus of the present invention.

In FIG. 2, a flowchart of a maximum segment size controlling method of a TCP is shown in relation to the operation of the embodiment of the present invention.

First, in case that a transmitted user data exists (B-3), processing is started.

Since a most suitable value of the maximum segment size (MSS) of a TCP changes in accordance with transfer condition at that time of a radio packet, it is determined whether resetting is necessary every time a transmission demand of a user data occurs (B-2). Information for the determination can be acquired from the radio packet control interface 204 shown in FIG. 1.

If it is determined that the resetting is necessary, the maximum segment size is set to a new value (B-3). In the maximum segment size, there are one for transmission and one for reception. When a data transfer is conducted in the new maximum segment size for transmission, a segment, in which information of the new maximum segment size for reception is added to a TCP header to be attached to the segment, is generated (B-4), and segment sending processing is conducted (B-5).

Figure 8:
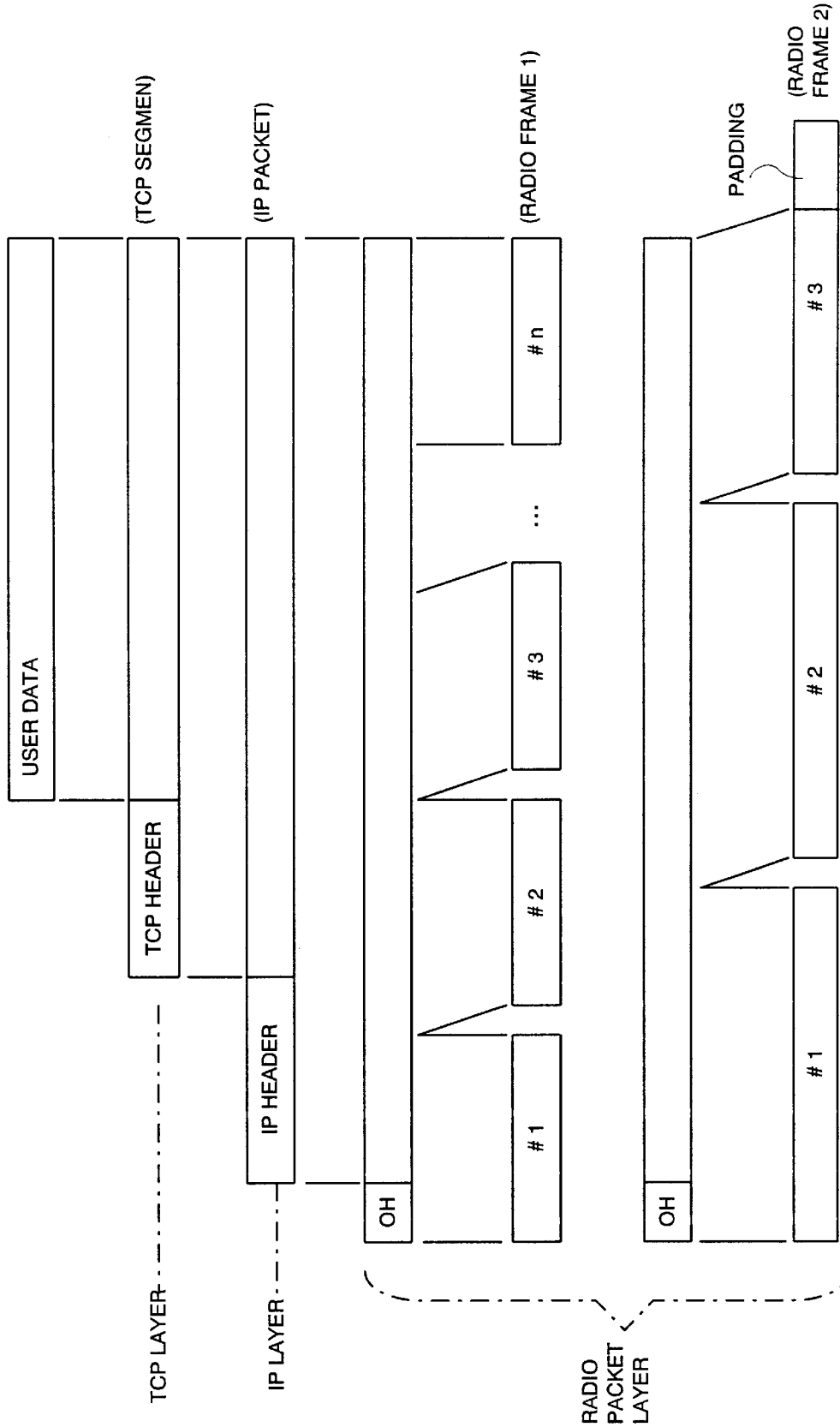
FIG. 8 is a view of a data flow between layers.
Figure 9:
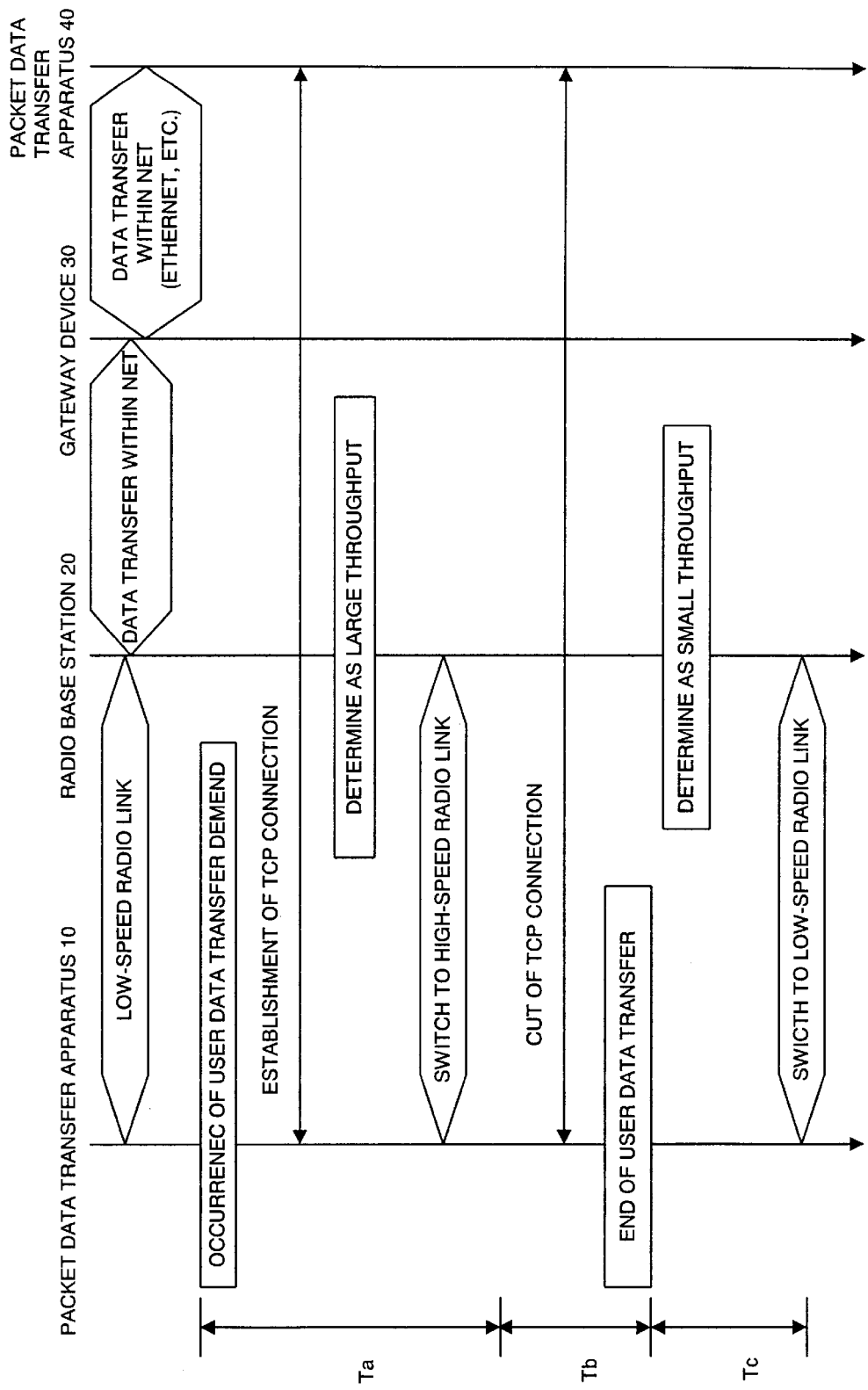
FIG. 9 is a time line view of a conventional radio packet data transfer.

By using this control, when a TCP segment having the maximum segment size is sent, a radio frame in which padding occurs, as in the case of the radio frame 2 shown in the prior art data flow of FIG. 8, does not occur.

Next, an entire operation of the embodiment of the present invention will be explained by using FIG. 3.

A case in which a user data transfer demand occurs during condition of a low-speed radio link will be explained. When a data transfer having large throughput is predicted through the TCP control interface 404 of FIG. 1 or from the contents of a transmitted user data, the packet data transfer apparatus 10 issues a demand to the radio base station 20 so as to switch the low-speed radio link to a high-speed radio link before establishment of a TCP connection. In accordance with that, the radio base station 20 conducts switching to the high-speed radio link. At time period from the issuance of the user data transfer demand to the switching to the highspeed link is Td.

The packet data transfer apparatus 10 conducts data transfer processing from the establishment of a TCP connection when it is switched to the high-speed link, and cuts the TCP connection when a transfer of a data to be transferred is finished. The time period required for the data transfer is Te.

When the user data transfer is finished, throughput after that apparently becomes small (zero). Accordingly, the: packet data transfer apparatus 10 immediately issues a switch demand from the high-speed radio link to a low-speed radio link, and switches the radio link to a low-speed one. The time period required for this processing is Tf.

By means of the embodiment of the present invention, which was shown above, the data transfer throughput is improved.

This is because, since the most suitable TCP maximum segment size is used in accordance with transfer condition of a radio packet having a low-speed link or a high-speed link, useless padding does not occur in a radio frame.

Also, that is because, since the TCP data transfer processing is not conducted in the low-speed link and is conducted only in the high-speed link, a sum total of a transfer time of period is shortened.

Also, by means of the embodiment of the present invention, effective utilization of radio resources is facilitated.

This is because, since a time period to the switching to the low-speed radio link after the user data transfer is shortened, radio resources for the high-speed link becomes not to be wasted.

Furthermore, by means of the embodiment of the present invention, timer control of the TCP becomes to be conducted more appropriately, and a drop of the throughput and an addition thereof to a network due to occurrence of unnecessary resending of a TCP segment, and so forth can be reduced.

This is because, since conventionally a TCP data transfer is conducted in both of the low-speed link and the high-speed link, reliability of round trip time measured by obtaining a confirmation response of a TCP is low, and however, since a link having the same speed is maintained during a data transfer, reliability of the round trip time is improved.

In radio packet communication in IMT-2000, a competitive system in which the same radio channel is shared with other radio mobile stations is used when data throughput is comparatively small, and a reservation system in which individual radio channels are allocated for every radio mobile station is used when data throughput is comparatively large.

In other words., these are corresponding to the radio low-speed link and the radio high-speed link which were shown in the embodiment. Accordingly, the present invention can be applied to a packet communication service of the IMT-2000 as it is.

With regard to an arrangement, it is the same as FIG. 1 shown in the embodiment. Here, each functional block of the IMT-2000 is allocated to radio packet layers shown as the layer 1 and the layer 2 that were shown in FIG. 1.

Next, an operation of the embodiment will be explained.

Figure 5:
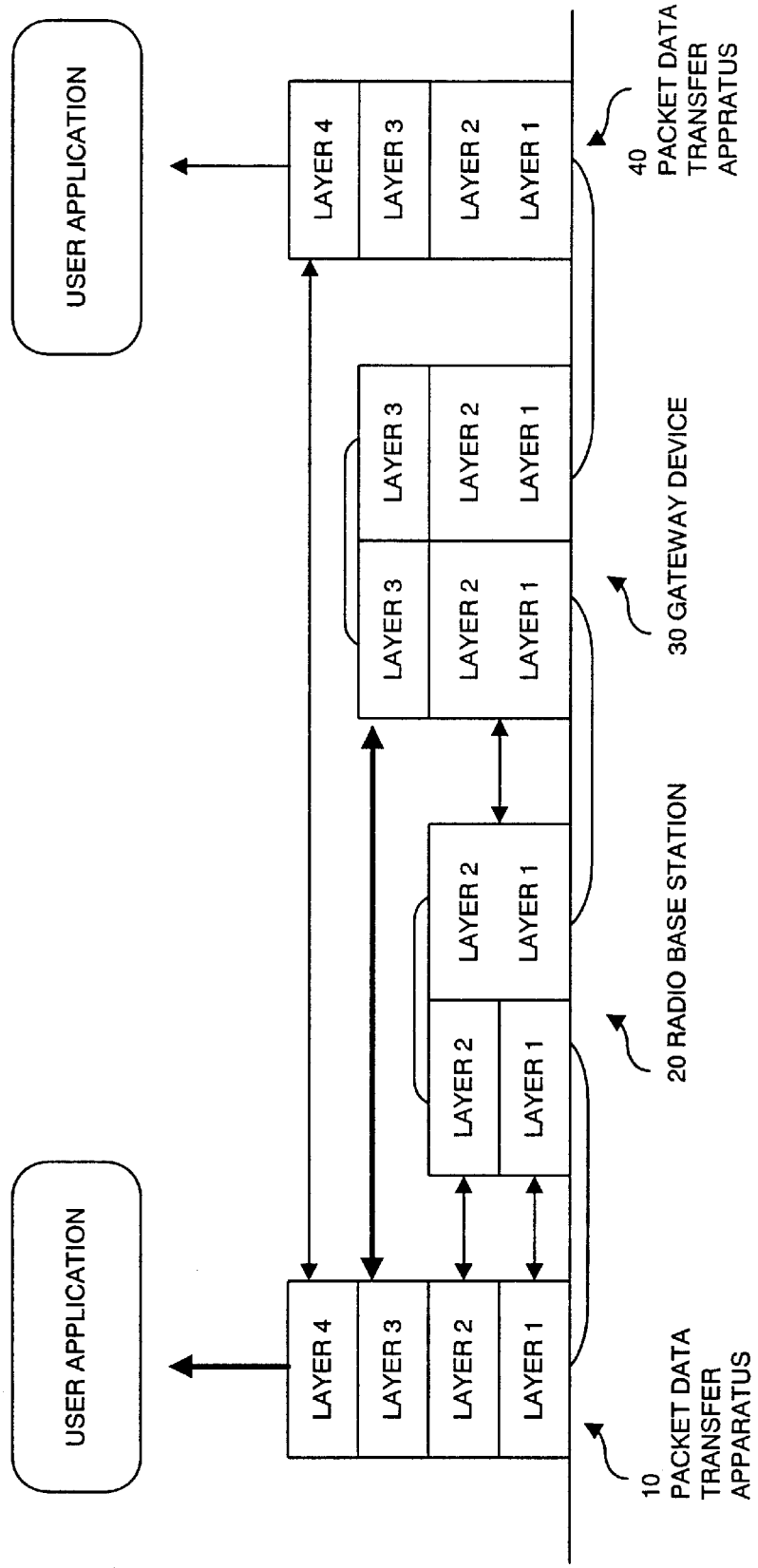
FIG. 5 is a protocol stack view of radio packet communication.

In this embodiment, a case will be explained, in which a user application on the packet data transfer apparatus 40 of FIG. 5 is a Web browser, and a user application on the packet data transfer apparatus 10 is a Web browser.

Figure 3:
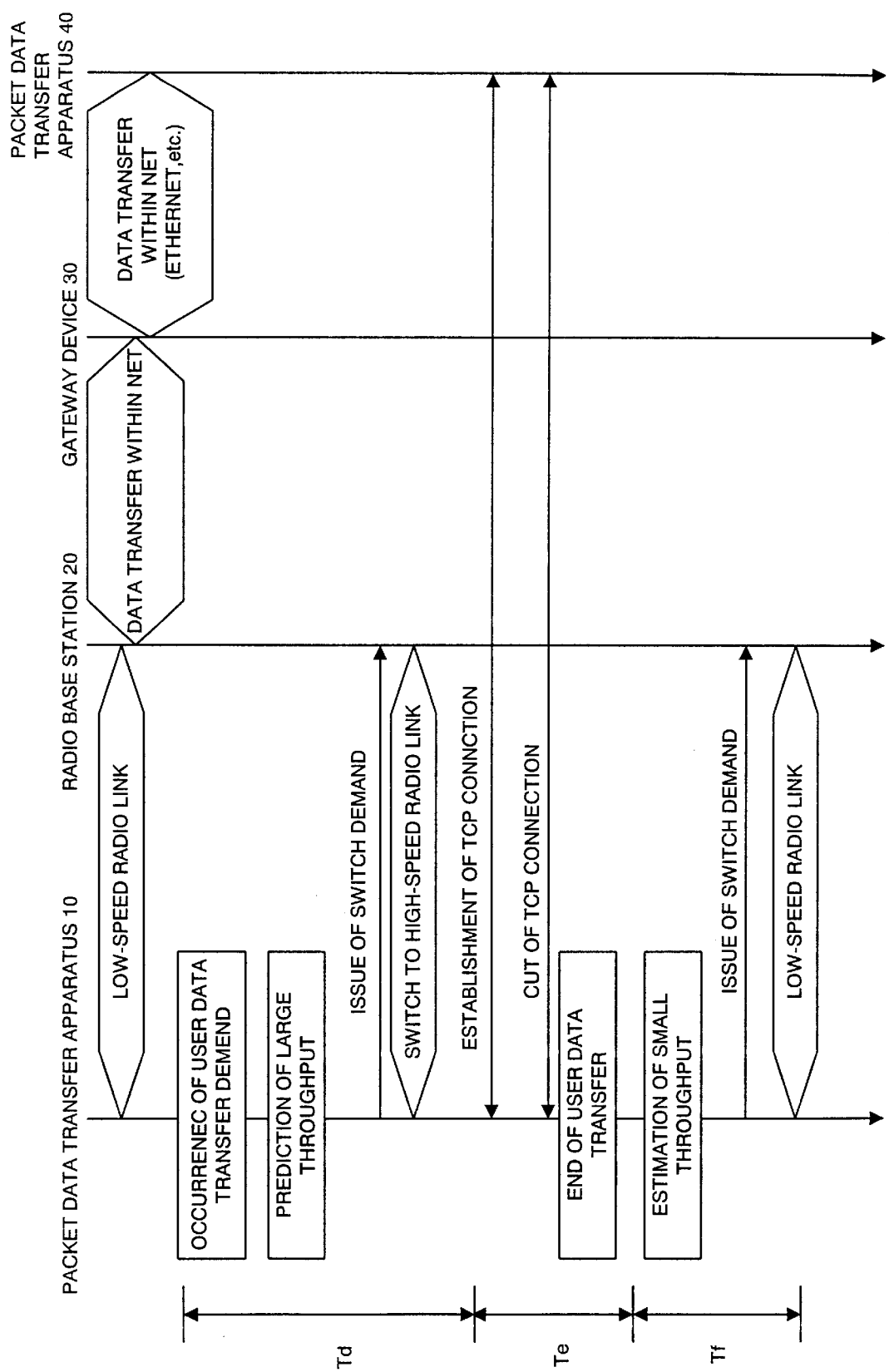
FIG. 3 is a time line view of a radio packet data transfer of the present invention.

For a figure for the explanation of an operation, a time line view of FIG. 3 is used. Here, it is assumed that the packet data transfer apparatus 10 is a mobile station.

Initially, the mobile station is under condition in which it competitively utilizes a radio channel that is common to other mobile stations. In case that the mobile station designates a certain specific URL by means of the Web browser, and conducts a transfer of an HTML file, since the mobile station can predict that a transfer of a user data having large throughput occurs by observing that an initial transmitted user data starts from "GET/", the mobile station immediately issues a demand of individual radio channels of a reservation system.

The radio base station 20 receives this, and if there is a margin in radio resources, the individual radio channels are allocated, and condition in which a high-speed data transfer can be realized is established. At this time, a maximum segment size appropriate for the individual radio channels when a TCP connection is established is also notified. Thereafter, down-load of the HTML file is conducted.

Figure 4:
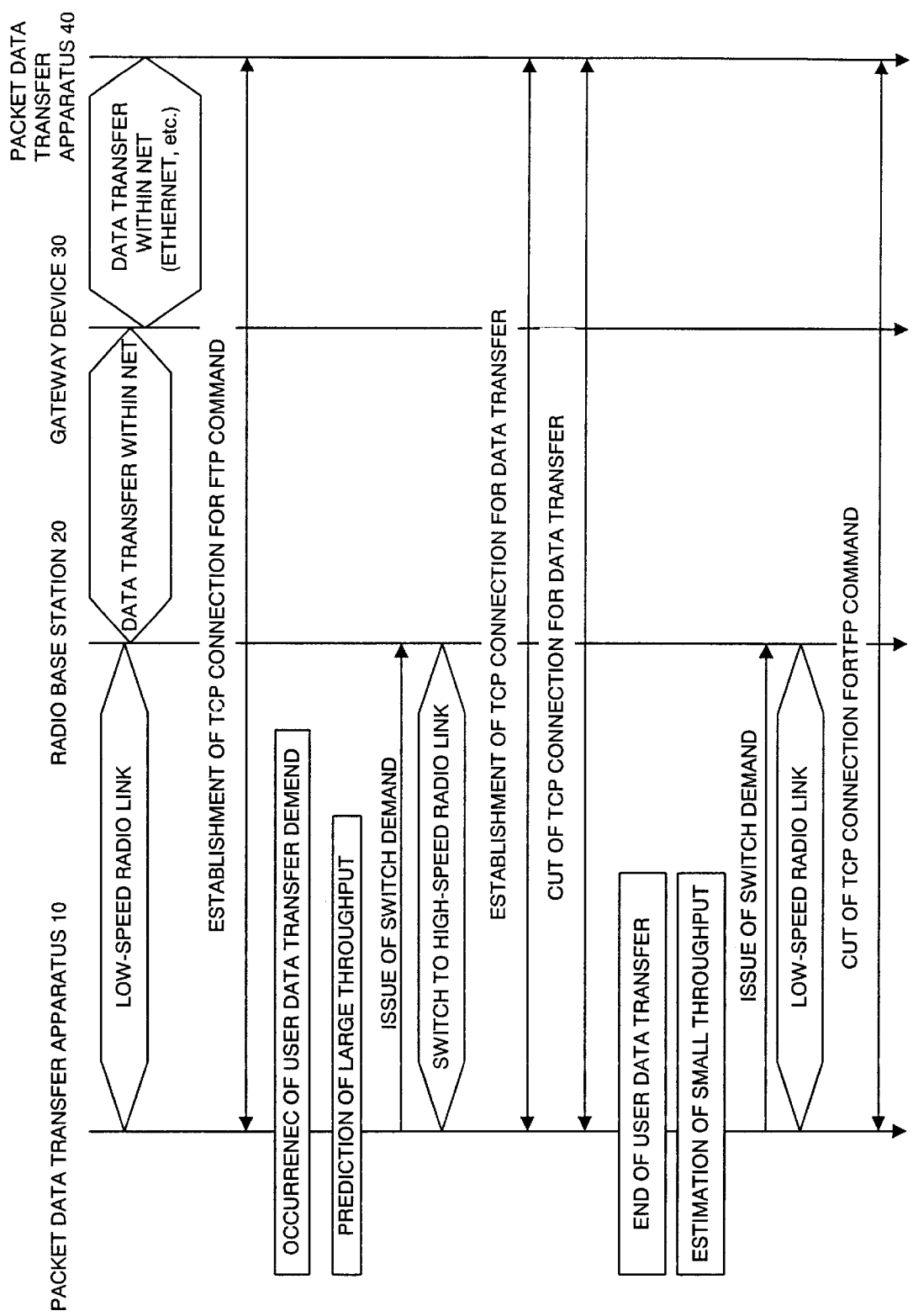
FIG. 4 is a time line view of a radio packet data transfer of another embodiment of the present invention.

Next, in case of using an FTP for a user application, its time line is shown in FIG. 4.

In this case, a user application on the packet data transfer apparatus 40 shown in FIG. 5 is an FTP server, and a user application on the packet data transfer apparatus 10 is an FTP client.

Initially, the mobile station is under condition in which it competitively utilizes a radio channel that is common to other mobile stations. When the FTP client has access to the FTP server, initially a TCP connection for an FTP command is set. At this time, a maximum segment size is set to a most suitable value because of a competitive system.

In case that a transmitted user data is an FTP command which starts from "get", "put" and so forth, the mobile station predicts that a transfer demand of a user data having large throughput occurs, and immediately issues a demand of individual radio channels of a reservation system.

The radio base station 20 receives this demand, and if there is a margin in radio resources, the individual radio channels are allocated, and condition in which a highspeed data transfer can be realized is established. When a TCP connection for a data transfer is established, a maximum segment size appropriate for the individual radio channels is set.

Thereafter, transfer processing of a file is conducted. The file transfer is finished, and when the TCP connection for a data transfer is cut, since it is predicted that condition of the user data transfer is moved to small throughput, the mobile station issues a demand for the switching to a radio link and a competitive system. The radio base station 20 receives this demand, and switching to a radio channel which is competitively utilized by other mobile channels is conducted.

A first advantage is that TCP data transfer throughput is improved.

The reason thereof is that, since a TCP segment is generated with a maximum segment size which is most suitable at that time in accordance with transfer condition of a radio packet, useless padding does not occur in a step in which a radio frame is constructed. Also, since, by predicting large throughput of a user data before a start of a data transfer and conducting a data transfer under condition of a high-speed link, a data transfer in a low-speed link due to a detection delay of a throughput level by means of the conventional radio base station is eliminated, a sum total transfer processing time period is shortened.

A second advantage is that a most suitable allocation of radio resources can be realized.

The reason thereof is that, by predicting small throughput of a user data after a data transfer is finished and conducting the switching to the low-speed link, it is possible to avoid a useless occupation of radio resources for the high-speed link due to a detection delay of a throughput level by means of the conventional radio base station.

A third advantage is that timer control of a TCP becomes to be conducted appropriately, and resending of an unnecessary TCP segment does not occur.

The reason thereof is that, since the radio link speed is maintained constant during a TCP data transfer, mismatch of the timer control, which occurs in case that data transfer processing is conducted in the low-speed link and the high-speed link like in the conventional manner, does not occur.

What is claimed is:

1. A packet data transfer apparatus comprising
   a layer 4 segment generating section for (1) dividing transmission transfer data in accordance with whether it is less than or equal to a predetermined size, (2) adding a layer 4 protocol header, and (3) generating a layer 4 segment,
   a layer 3 packet generating section for adding a layer 3 protocol header to said layer 4 segment and generating a layer 3 packet,
   a layer 2 packet generating/sending section for adding a header or a trailer of a layer 2 protocol to said layer 3 packet and generating a layer 2 packet,
   a layer 1 transmission and reception processing section for applying a layer 1 protocol process to said layer 2 packet and transferring said layer 2 packet to a data transfer device of another party to communicate with, and for applying the layer 1 protocol process to reception data from a packet data transfer device of the other party and reconstructing the layer 2 packet,
   a layer 2 packet receiving section for removing a layer 2 header or trailer from said reconstructed layer 2 packet and reconstructing the layer 3 packet,
   a layer 3 packet receiving section for removing a layer 3 header from said reconstructed layer 3 packet and reconstructing the layer 4 segment, a layer 4 segment receiving section for removing a layer 4 header from said reconstructed layer 4 segment and outputting a reception transfer data,
   a layer 4 segment transmission and reception controlling section for controlling said layer 4 packet generating section and said layer 4 segment receiving section,
   a layer 3 packet transmission and reception controlling section for controlling said layer 3 packet generating section and said layer 3 segment receiving section, and a layer 2 packet transmission and reception controlling section for controlling said layer 2 packet generating/sending section and said layer 4 segment receiving section, said layer 4 segment transmission and reception controlling section conducting communication of layer 4 control data with a layer 4 segment transmission and reception controlling section of the data transfer device of the other party through a process identical to that applied to said transmission transfer data, and said layer 3 packet transmission and reception controlling section conducting communication of a layer 3 control data with a layer 3 packet transmission and reception controlling section of the data transfer device of the other party, through a process identical to that applied to said transmission transfer data, wherein said layer 2 packet transmission and reception controlling section has a layer 2 packet control interface for making another layer acquire layer 2 information or requiring layer 2 control to be applied to said layer 2 packet transmission and reception controlling section, said layer 4 segment transmission and reception controlling section comprising means for controlling a maximum size of the layer 4 segment based on the layer 2 information acquired through said layer 2 packet control interface, and said layer 3 packet transmission and reception controlling section comprising means for controlling a maximum size of the layer 3 packet based on the layer 2 information acquired through said layer 2 packet control interface.

2. A packet data transfer apparatus according to claim 1, said layer 3 packet transmission and reception controlling section and said layer 4 segment transmission and reception controlling section comprising means for acquiring updated layer 2 information through said layer 2 packet control interface even during a data transfer process, and dynamically control a maximum packet size and a maximum segment size, respectively.

3. A packet data transfer apparatus according to claim 1, said layer 4 segment transmission and reception controlling section comprising means for predicting condition of a data transfer which occurs just after a data transfer demand from a user application, and issuing a layer 2 packet transfer control demand to said layer 2 packet transmission and reception controlling section through said layer 2 packet control interface.

4. A packet data transfer apparatus according to claim 3, said layer 2 packet transmission and reception controlling section comprising means for receiving, a layer 2 packet transfer control demand from said layer 4 segment transmission and reception controlling section, and communicating the layer 2 packet transfer control demand to a layer 2 packet transmission and reception controlling section on a network.

5. A packet data transfer apparatus according to claim 1, wherein said layer 2 protocol conducts a layer 2 packet transfer in a high speed mode when throughput of a data to be transmitted and received is large, and conducts a layer 2 packet transfer in a low speed mode when throughput of a data to be transmitted and received is small.

6. A packet data transfer apparatus according to claim 1, wherein said layer 3 protocol is an IP, and the layer 4 protocol is a TCP.

* * * * *